United States Patent
Guckenberger et al.

(10) Patent No.: US 8,953,909 B2
(45) Date of Patent: Feb. 10, 2015

(54) SYSTEM, METHOD, AND COMPUTER SOFTWARE CODE FOR MIMIC TRAINING

(76) Inventors: Elizabeth T. Guckenberger, Montverde, FL (US); Ronald J. Guckenberger, Montverde, FL (US)

(*) Notice: Subject to any disclaimer, the term of this patent is extended or adjusted under 35 U.S.C. 154(b) by 68 days.

(21) Appl. No.: 13/066,707

(22) Filed: Apr. 20, 2011

(65) Prior Publication Data
US 2012/0206577 A1    Aug. 16, 2012

Related U.S. Application Data

(63) Continuation-in-part of application No. 11/625,181, filed on Jan. 19, 2007, now Pat. No. 8,208,764.

(60) Provisional application No. 60/760,573, filed on Jan. 21, 2006.

(51) Int. Cl.
   *G06K 9/54* (2006.01)
   *G09B 19/00* (2006.01)
   *G06T 11/00* (2006.01)

(52) U.S. Cl.
   CPC ............ *G09B 19/003* (2013.01); *G06T 11/00* (2013.01)
   USPC ............ 382/305; 434/247; 434/252; 472/61; 473/150; 473/266

(58) Field of Classification Search
   None
   See application file for complete search history.

(56) References Cited

U.S. PATENT DOCUMENTS

| | | | |
|---|---|---|---|
| 4,845,645 A | 7/1989 | Martin et al. | |
| 5,184,295 A | 2/1993 | Mann | |
| 5,249,967 A * | 10/1993 | O'Leary et al. | 434/247 |
| 5,603,617 A * | 2/1997 | Light | 434/252 |
| 5,681,223 A * | 10/1997 | Weinreich | 472/61 |
| 5,971,766 A * | 10/1999 | Guiney | 434/252 |
| 2004/0209698 A1* | 10/2004 | Ueda et al. | 473/150 |
| 2006/0094523 A1* | 5/2006 | Hall | 473/266 |
| 2007/0172155 A1 | 7/2007 | Guckenberger | |

OTHER PUBLICATIONS

Peter M. Crane, Dutch Guckenberger, Brian Schreiber, Robert Robbins Above Real-Time Training Applied to Air Combat Skills, United States Air Force Armstorng Laboratory, AL/HR-TR-1997-0104, Aug. 1997 (78 pages).

(Continued)

*Primary Examiner* — Tsung-Yin Tsai
(74) *Attorney, Agent, or Firm* — Terry M. Sanks, Esq.; Beusse Wolter Sanks & Maire, P.A.

(57) ABSTRACT

A system for visually superimposing a first image that may be in motion over and/or under a second image that may be in motion, the system including at least one generating device to provide a first image and a second image, a display device to display the first image and second image superimposed with each other, and an adjustment device for reconfiguring the first image and/or the second image to a size in agreement with a non-adjusted first image and/or second image, to a size in agreement with the display device, and/or to a size acceptable by a user. The first image or the second image is displayed in a different media than the other image to allow for a distinction to be made between movements occurring in both images. A method for visually superimposing a first image that may be in motion over and/or under a second image that may be in motion is further disclosed.

19 Claims, 9 Drawing Sheets

(56) References Cited

OTHER PUBLICATIONS

Dutch Guckenberger, Kevin Uliano, Norman Lane, The Application of Above Real-Time Training (ARTT) for Simulators: Acquiring High Performance Skills 14th Interservice/Industry Training Systems and Education Conference, San Antonio, Texas, 1992, pp. 928-935.

Dutch Guckenberger, Kevin Uliano, Norman Lane, Teaching High-Performance Skills Using Above-Real-Time Training NASA Technical Report Contract NAG-2-750, Augusta 1993, (70 pages).

Dutch Guckenberger, W.K. Andrews, The Interactiave Playback Utility, the 10th DIS Workshop on Standards for the Interoperability of Defense Simulations vol. 1, Mar. 14-18, 1994, Contract No. N61339-91-C-0091 STRICOM Summary Report.

Dutch Guckenberger, Laura Miller, Elizabeth Guckenberger, Ralph Whitney, Johnny Green, Seeing Tomorrow's Educational Solutions Today: The Intergration of Interactive Television and Distributed Interactive Simulation; SimTec96 Australia, SimTect 96 Proceedings.

Dr. P. Crane, D. Guckenberger, 2000, Above Real-Time Training. In Aircrew Training & Assessment, (Edited by H.F. O'Neil, Jr.; Dee H. Andrews) Lawrence Erlbaum Associates Publisher.

* cited by examiner

SYSTEM, METHOD, AND COMPUTER SOFTWARE CODE FOR MIMIC TRAINING

CROSS-REFERENCE TO RELATED APPLICATIONS

This application claims the benefit of U.S. Provisional No. 61/343,060 filed Apr. 20, 2010. This application also claims priority to and is a Continuation-In-Part of U.S. application Ser. No. 11/625,181 filed Jan. 19, 2007, which claims the benefit of U.S. Provisional Application No. 60/760,573 filed Jan. 21, 2006, and incorporated herein by reference in its entirety.

STATEMENT REGARDING FEDERALLY SPONSORED RESEARCH OR DEVELOPMENT

This invention was made with government support under Contract Nos. W31P4Q-07-C-0258AB and W31P4Q-09-C-0009 awarded by the U.S. Small Business Innovative Research (SBIR). The government has certain rights in the invention.

BACKGROUND OF THE INVENTION

Exemplary embodiments of the invention relate to training systems and, more particularly, to using superimposed visualization to allow for mimic training.

Prior art has concentrated on side-by-side training comparisons, and has not exploited advantages of superimposition of an instructor and a student's images. Before computers were available, side-by-side training methods consisted of use of large wall mirrors in dance and martial arts studios, so that students could see their mirror image and compare it to the instructor and/or the instructor's mirror image(s) by rapidly scanning back and forth for differences to correct. Chief problems with the mirror wall methods are the left-right reversal of the mirror which can confuse students, and the difficulty scanning between the two images looking for differences. With the advent of video, side-by-side comparison enabled "split-screen" that enabled the student to view their own image next to the instructors image (pre-recorded or live). The TV solutions also supported analog and eventually digital "flipping" of the imagery to eliminate the left-right reversal problems.

U.S. Pat. No. 5,184,295 issued Feb. 2, 1993, and entitled "System and Method for Teaching Physical Skills" by Ralph V. Mann, is believed by inventors of the current invention to teach using a plurality of images to generate an idealized human form model for teaching physical movements, and then a series of discrete comparison options of the student's image from the idealized model image. This approach suffers from multiple different types and levels of complexities in producing the idealized model, and especially in problems of comparisons of the student to the model that do not account for timing differences, nor shape and size differences between student and the idealized model. Problematic examples include calibration and reference point selections for the scaling process mentioned to even begin to work, a requirement of having an idealized model to scale, and requiring an idealized position to capture and compare the video to and other weaknesses most especially in the time domain. Further, the patent does not address shape differences of different body types that effect size measurements and comparisons. Further, the patent attempts to analyze relationships mathematically that are inferior to innate human perception in realistic contexts (person to person individualized training, etc.).

U.S. Patent Application Publication No. US 2006/0094523 A1, published May 4, 2006, and entitled "Method and Apparatus for Teaching How to Execute a Predetermined Motion," is very inconvenient, very difficult to use, and extremely limited by its requirements to use content specifically generated for use on full-length mirrors. For this invention to work, as understood by the inventors, all of the golf pro content has to be generated for the specific size of a full length mirror, with the content generated at a distance and at specific angles so that the student can mimic the same distance and angles as well as rotate their head to actually see the mirror with the golf pro image and their own reflection therein. Other shortcomings are associated with the student leaning forward or backwards differently or being of a different size than the golf pro image such that it throws off the perspective viewing and make the alignment coaching claimed into negative training. Other shortcoming of the invention include, but are not limited to: requiring a large mirror; requiring manual physical positioning; ignoring critical lighting configuration as well as brightness contrast difference between the reflected students image and the experts image; and no provision of live interactions between experts and students, etc. Further, the alternative embodiment with an extra screen behind the user suffers from requiring another screen, precise positioning an alignment of said screen in addition to the precise positioning and alignment of the associated mirror, with the added detractions of the users own image blocking the bulk of the detailed image of the expert image. Another key shortcoming is the reflected image is left right reversed which many users find distracting and hard to relate to.

All of the prior art lacks any teachings of the value of superimposed videos where at least one of which is semi-transparent of teacher and student so that students can either learn and practice by keeping their real-time opaque video image within the "ghost guide" of the teachers' videos shown as a semi-transparent layer on-top their own video imagery being displayed; by their real-time "ghost" image being superimposed over top of opaque teachers' video image, and various new types of uses based upon multiple layers of superimposed semi-transparent content.

The prior art teachings in the area of operational instrument display enhancement may be found in U.S. Pat. No. 4,845,645, assigned to the United States Air Force, and entitled "Sequential Rapid Communication Visual Displays" (RAPCOM). The inventors understand that this expired patent teaches sequentially presenting aircraft digital displayed information in the same area in a rapid temporal sequence that eliminates eye saccades, increases information throughput, and increases retention of the faster presented information. The Human eye/brain system is essentially "blind" and not recording visual information during eye-saccades, reducing both the frequency and intensity of the visual information processed by conventional side-by-side training methods. Prior art also specifies upon the scientific foundation of rapid sequential visual presentation (RSVP), identification and comprehension remains satisfactory. (RSVP reference Reading in the Brain by Stanislas Dehanene printed by Viking Press (pages 17 and 18) ISBN 978-0-670-02110-9 Copyright 2009). RSVP is a more recent scientific naming convention for the basis of RAPCOM to increase reading understanding speeds up to 3 or 4 times normal English reading speeds, thus providing advantages to increase to staggering reading speeds of 1,100 words per minute, and up to 1,600 words per minute for the best readers. This improvement results in reading approximately one word every 40 milliseconds, and 3 to 4 times faster than normal reading speeds.

However, users of such technology are still at a disadvantage as since the prior art is limited. Users of such technology would benefit from a system and method which allows for overlaying a user's image which can be placed in motion with that of an expert's image which can be placed in motion where dynamically reconfiguring (or resizing) the first image and/or the second image to a size in agreement with a non-adjusted first image and/or second image, to a size in agreement with the display device, and/or to a size acceptable by a user is provided.

BRIEF DESCRIPTION OF THE INVENTION

Embodiments of the present invention relate to a method, system, and computer software code for visually superimposing a first image that may be in motion over and/or under a second image that may be in motion. The system comprises at least one generating device to provide a first image and a second image, a display device to display the first image and second image superimposed with each other, and an adjustment device for reconfiguring the first image and/or the second image to a size in agreement with a non-adjusted first image and/or second image, to a size in agreement with the display device, and/or to a size acceptable by a user. The first image or the second image is displayed in a different media than the other image to allow for a distinction to be made between movements occurring in both images.

The method comprises generating a first image and a second image;
displaying a first image superimposed with a second image, reconfiguring the first image and/or the second image to a size in agreement with a non-adjusted first image and/or second image, to a size in agreement with a device used to display the superimposed images, and/or to a size acceptable by a user, and displaying the first image and/or the second image in a different media to allow for a distinction to be made between movements occurring in both images.

The computer software code is stored on a computer readable media and executable with a processor. The computer software code comprises a computer software module for generating a first image and a second image, a computer software module for displaying a first image superimposed with a second image, a computer software module for reconfiguring the first image and/or the second image to a size in agreement with a non-adjusted first image and/or second image, to a size in agreement with a device used to display the superimposed images, and/or to a size acceptable by a user, and a computer software module for displaying the first image and/or the second image in a different media to allow for a distinction to be made between movements occurring in both images.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
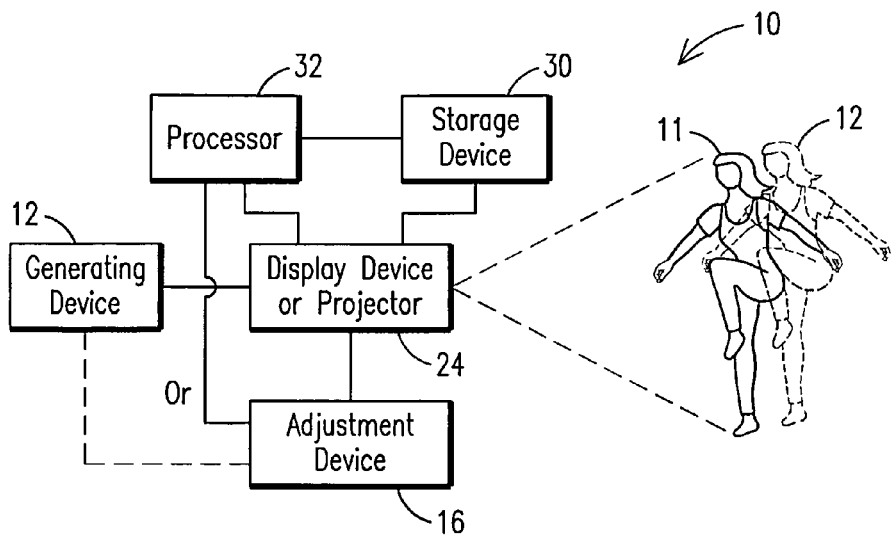
FIG. 1 depicts a system for visually superimposing a first image that may be in motion over and/or under a second image that may be in motion.

Reference will be made below in detail to exemplary embodiments of the invention, examples of which are illustrated in the accompanying drawings. Wherever possible, the same reference numerals used throughout the drawings refer to the same or like parts. As disclosed below, multiple versions of a same element may be disclosed. Likewise, with respect to other elements, a singular version is disclosed. Neither multiple versions disclosed nor a singular version disclosed shall be considered limiting. Specifically, although multiple versions are disclosed, a singular version may be utilized. Likewise, where a singular version is disclosed, multiple versions may be utilized.

Exemplary embodiments of the invention solve problems in the art by providing a method, system, and computer implemented method, such as a computer software code or computer readable media, for visually superimposing a first image that may be in motion over and/or under a second image that may be in motion. Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk, computer readable media, or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, a technical effect is to visually superimpose a first image that may be in motion over and/or under a second image that may be in motion so that a user associated with the first or second image may use the superimposed images for mimic training. To facilitate an understanding of the exemplary embodiments of the invention, it is described hereinafter with reference to specific implementations thereof Exemplary embodiments of the invention may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that perform particular tasks or implement particular abstract data types. For example, the software programs that underlie exemplary embodiments of the invention can be coded in different programming languages, for use with different devices, or platforms. In the description that follows, examples of the invention may be described in the context of a web portal that employs a web browser. It will be appreciated, however, that the principles that underlie exemplary embodiments of the invention can be implemented with other types of computer software technologies as well.

Moreover, those skilled in the art will appreciate that exemplary embodiments of the invention may be practiced with other computer system configurations, including multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through at least one communications network. In a distributed computing environment, program modules may be located in both local and remote computer storage media including memory storage devices.

Referring now to the drawings, embodiments of the present invention will be described. Exemplary embodiments of the invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

FIG. 1 depicts an exemplary embodiment of a block diagram of a system for visually superimposing a first image that may be in motion over and/or under a second image that may be in motion. As explained in further detail below the system 10 may be used as a training tool, and with such techniques at mirror mimicking training, technologies and/or techniques ("MMT"). At least one generating device 12 to provide a first image and a second image is provided. As disclose in more detail below, more than one generating device 12 may be provided, such as a first one (a video camera) for capturing an image of a user, and a second one for generating a previously captured image of the expert, or the object to be mimicked. A display device 14 is provided to display the first image and second image superimposed with each other. The display device 14 may be configured to project holographic imagery where a user sees images by encasing themselves (eyes at least) in 3-dimensional and/or virtual reality head mounted displays. The display device 14 may also interface with other game devices, such as but not limited to Microsoft's Project NATAL, and/or Nintendo's Wii. This display may also have a smokey glass where images are provided with a neon appearance.

An adjustment device 16 is provided for reconfiguring the first image and/or the second image to a size in agreement with a non-adjusted first image 11 and/or second image 13, to a size in agreement with the display device, and/or to a size acceptable by a user. For example, scaling of any semi-transparent, or opaque layer with aspect ratio preserved, horizontal only, vertical only, to enable users to fit images taken from different distances, different lens, and of persons of different heights or wideness to better "fit" when superimposed is possible. Automated scaling is also supported using conventional bounding box type algorithms. Further by using motion capture driven avatars for the expert, the user, or both, our advantages include true 3D superimposed pairs that either can view from any angle or perspective on their own systems. As is also discussed in further retail below, the first image 11 or the second image 13 is displayed in a different media than the other image that allows for a distinction to be made between movements occurring in both images.

Figure 2:
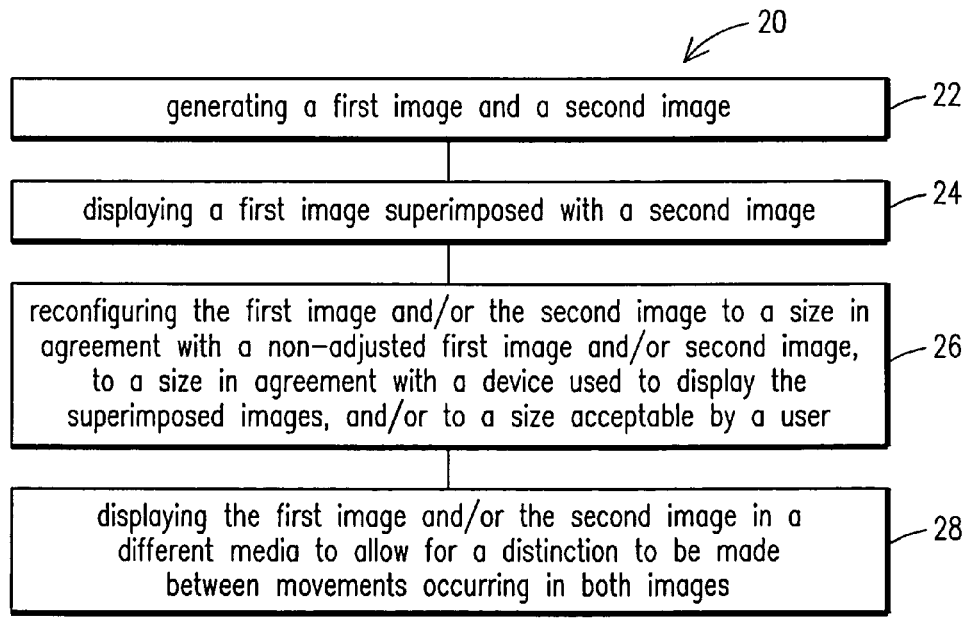
FIG. 2 depicts a method for visually superimposing a first image that may be in motion over and/or under a second image that may be in motion.

FIG. 2 depicts an exemplary embodiment of a flowchart 20 illustrating a method for visually superimposing a first image that may be in motion over and/or under a second image that may be in motion. As explained in further detail below the method may be used in a training tool. The method comprises generating a first image and a second image, at 22. The method further comprises displaying a first image superimposed with a second image, at 24. The method further comprises reconfiguring the first image and/or the second image to a size in agreement with a non-adjusted first image and/or second image, to a size in agreement with a device used to display the superimposed images, and/or to a size acceptable by a user, at 26. The method further comprises displaying the first image and/or the second image in a different media to allow for a distinction to be made between movements occurring in both images, at 28.

The images may be displayed in a different media. Exemplary media include, but is not limited to, semi-transparent media, opaque media, superimposed visualization surface (polygons, or other virtual surfaces), tinting changes, alpha changes, color changes, intensity changes, temporal changes (flashing, blinking, special textures, etc.), lighting changes, texture or pattern changes, sharpness changes, contrast changes associated look-up lists of modifiers, and other differential semi-transparency and imagery mixing means. The semi-transparent media may be further enhanced, such as but tinting. An expert's image provided as tinted semi-transparent may be superimposed over top of an opaque patient/student's video correctly staying within the "ghost guide". The tinting makes the layers easier to visually distinguish and with advanced background elimination features users can refine the ghost guide to just the ghost alone (green screen effects, etc.). In another example, the expert is provided in a tinted opaque image placed under Semi-transparent Patient/Student Video. This may result in movement errors being easier to see when outside the tinted areas. Addition of a contrasting color yellow opaque background to the expert videos and patient/student imagery as semi-transparent layers enable innovations such as green tinted Semi-transparent expert over red tinted semi-transparent patient/student video where correct movements result in a Purple combined imagery. In another example, a green semi-transparent expert image place over red tinted semi-transparent patient/student video would result in incorrect movements appearing as orange tinted areas where the movement errors overlap into the yellow background. Beyond human attention getting color changes, color detection based automated error detection by having a graphics processing unit ("GPU") or central processing unit ("CPU") as further aids to users, such as but not limited to medial staff, for logging errors, providing cues to improve, and most importantly compliance enforcement tool (for when the medical staff are not watching).

Selecting the media, including a degree of the media such as the degree of semi-transparency is under the control of the user. With respect to transparency, the user may select opaque to fully transparent. The system may be configured where the level is determined based on a "goodness" level which may take into account brightness, contrast, gain, etc. Other factors that may be considered may include computer or communication network settings.

The display and/or generating device may be able to provide such features as providing an opaque image, semi-transparent image, fading the image(s), morphing the image(s), blinking the image(s), overlapping the image(s), mirroring the image(s), positing the images adjacent to each other, superimposing the image(s), time-sequencing the image(s), warping the image(s), distorting the image(s), scaling the image(s), coloring the image(s), highlighting the image(s), and grouping aspects of the images, such as a body and/or avatar, and/or facial images. These features are possible with a processor 32. The processor 32 is also configured to provide for hyper-spectral, 3D stereoscopic, and hyper-stereoscopic processing. Additional sensors may be used to provide these features as well. The process may also perform the alpha channel changes by layer, by color, by region, by date-time tag or other tagging means. Means can include but are not limited to CPU processing, GPU processing, specialized algorithms (AND, OR, NOR, NAND logical operational sequences, bitwise register shifts, etc.).

A storage device 30 may also be included. Superimposition and/or semi-transparency constructs may comprise a registry of stored pixels and associated electronic data. The stored pixels can be semi-transparency and superimposition pixels that are linked to the electronic data that comprises a semi-transparent and/or superimposed pixel means such as color change or tint along with associated dataset tagging or comparisons such as the active intensity and duration of color combinations, and/or intersections, and/or "special" edge or shape collision detections, and/or edge, along with the recentness of the last change occurrence, plus any history trails or predicted position "ghosting" images, including options for direct event detection to provide automatically retrievable user help, suggestions, alerts, or temporal manipulations to assist users. The registry of stored pixels are pattern matched to said semi-transparency and superimposition constructs (stored or live) so that the events can be realistically rendered from one or more layers to find "best-fit" needed scanning visualization requirements, dynamic performance measuring or monitoring, etc. The stored pixels are pattern matched against the semi-transparency and superimposition constructs or stored database lookups which are expert generated, or physics based models. Additionally, the stored pixels may be linked to a "best-fit" fading algorithm based upon elapsed time since a last event of interest, detection, and/or another criterion. As explained herein, reducing of the user eye saccades (compared to conventional side-by-side comparisons) is possible. Doing so increases effectiveness, efficiency, and retention of information, thus providing an intuitive means for simultaneous comparisons that exploits innate natural mimicry human capacities that were evolved by Darwinian Natural Selection inclusive of the mirror neuron networks within humans.

Figure 3:
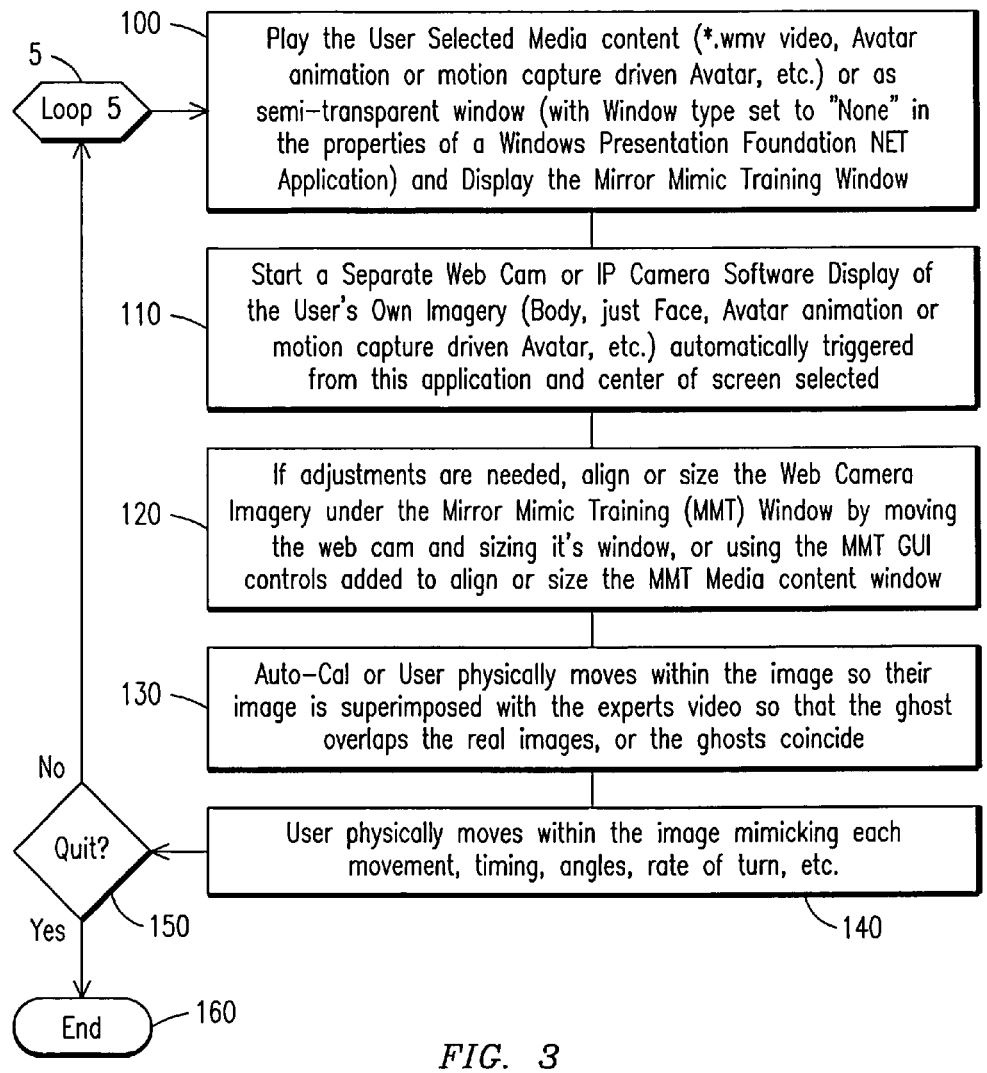
FIG. 3 depicts a flow chart diagram of an exemplary embodiment method of Mirror Mimic Training that may be performed through software (object code provided on the accompanying CD)

FIG. 3 depicts a more detailed flowchart of an exemplary embodiment method of mirror mimic training that may be performed through software (object code provided on the accompanying CD). The method may be implemented on Microsoft's .Net 4.0 as a Windows Presentation Foundation Application and utilizing web or IP cameras, and providing a multiple levels and types of Mirror Mimic Training processes and advantages. As illustrated, Block 5 depicts a top of a loop where on a first iteration an initialization process is used after completion of the initialization. Control then proceeds to block 100. Block 100 is a process block which Play the User Selected Media content (*.wmv video, etc) as a semi-transparent window (with Window set to "None" in the properties of a Windows Presentation Foundation .NET Application) and Display the Mirror Mimic Training Window. Control then proceeds to block 110. Block 110 is a processing block which starts a Separate Web Cam or IP Camera Software Display of the User's Own Imagery (Body, just Face etc) automatically triggered from this application and center of screen selected. Control then proceeds to block 120. Block 120 is a processing block that if adjustments are needed, align or size the Web Camera Imagery under the Mirror Mimic Training (MMT) Window by moving the web cam and sizing its window, or using the MMT graphical user interface (GUI) controls added to align or size the MMT window. Control then proceeds to block 130. Block 130 is a processing block that actually implements as the user physically moves within the image so that their image is superimposed with the expert's video so that the ghost overlaps the real images, or the ghosts coincide. Control then proceeds to block 140. Block 140 is a processing block where the User physically moves within the image mimicking each movement, timing, angles, rate of turn, etc. Control then proceeds to block 150. Decision Block 150 is a "Quit" or "Not Selection" opportunity by the user, the running simulation, Artificial Intelligence, or other executive object. If the selection is "No", then control then proceeds to block 5. If the selection is "Yes", control then proceeds to block 160. Termination End Block 160 provides the end of processing, the graphics or datasets can be persistent for other components or applications to visualize or use, or not as the user selected preferences.

Figure 4:
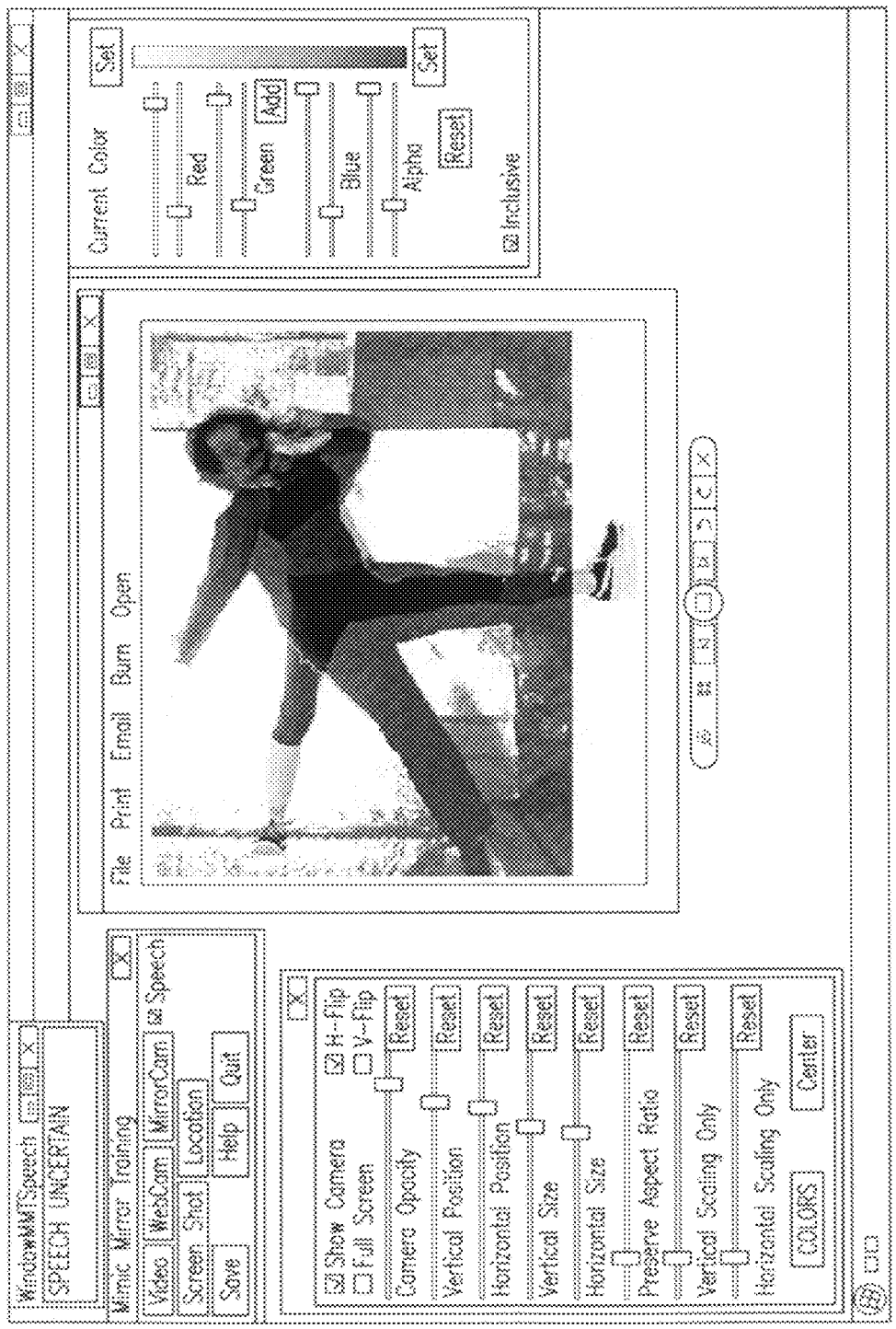
FIG. 4 depicts an exemplary embodiment of a screen capture of a semi-transparent expert's "ghost guide" over top an opaque web camera view of the student.
Figure 5:
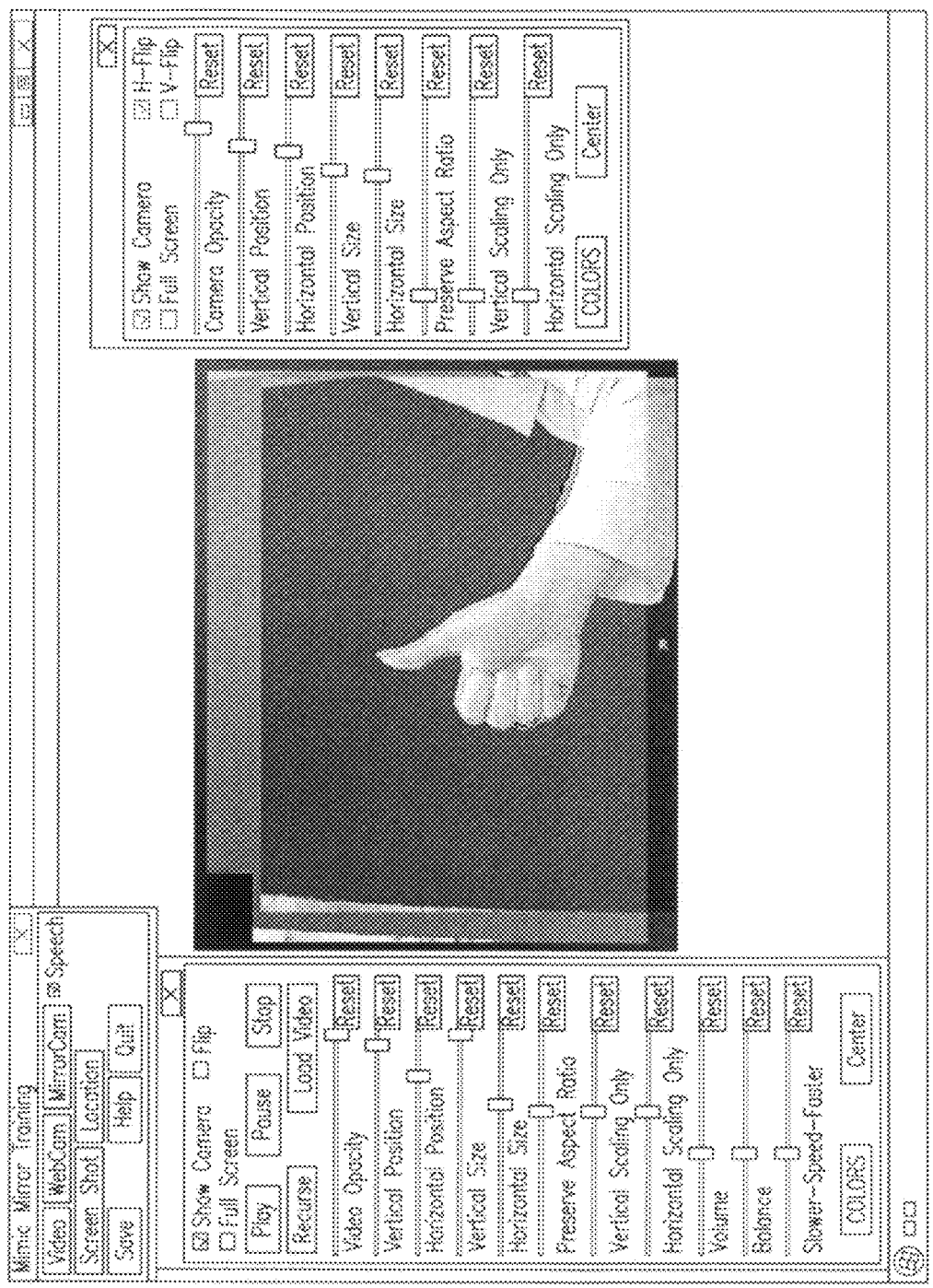
FIG. 5 depicts an exemplary embodiment of a screen capture of an opaque expert's "ghost guide" underneath a semi-transparent "ghost" web camera view of a student.
Figure 6:
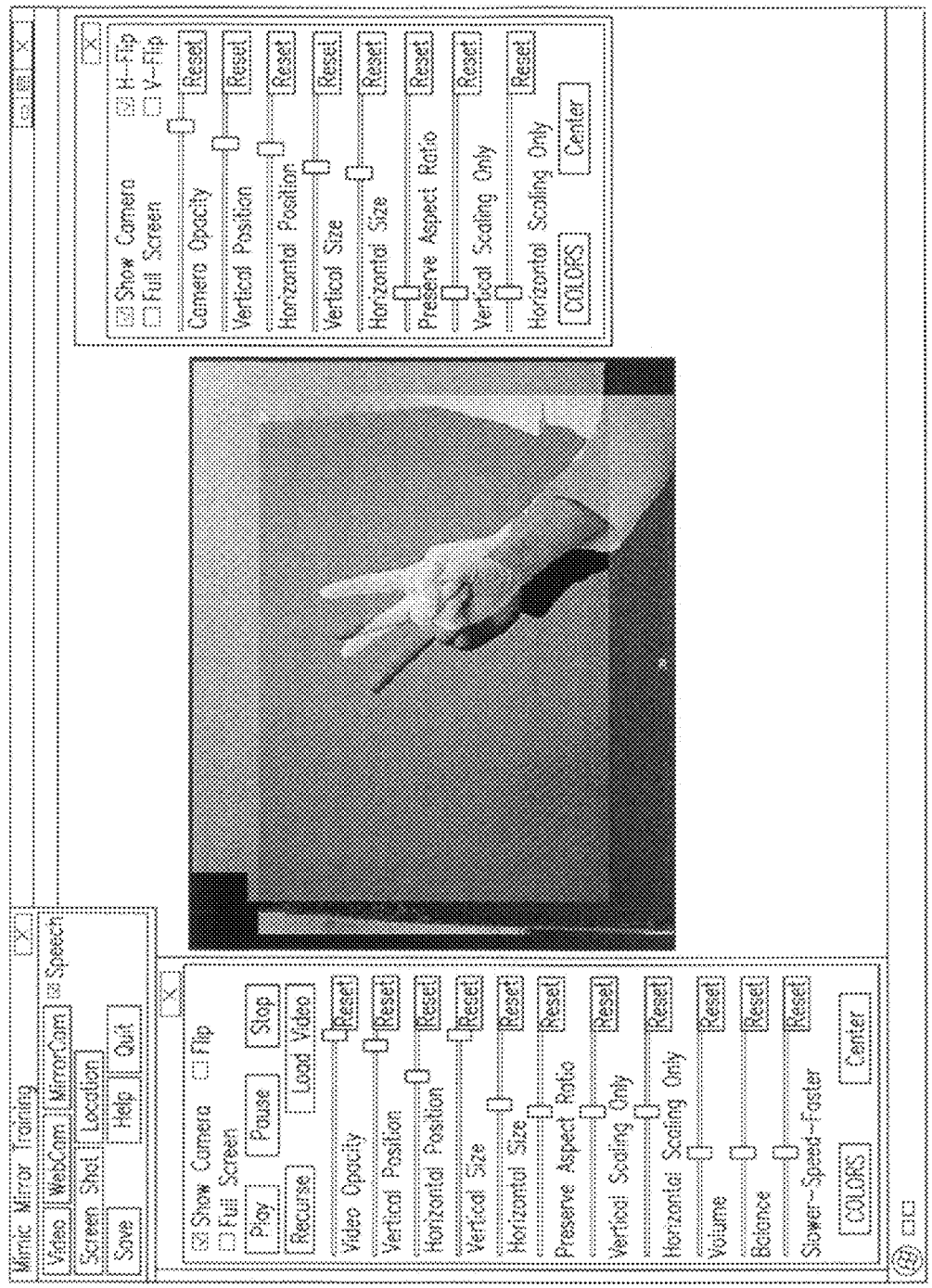
FIG. 6 depicts an exemplary embodiment of a screen capture of the semi-transparent expert's "ghost guide" underneath the semi-transparent "ghost" web camera view of the student, with tints applied to the expert's ghost guide, student ghost, and background showing the color change intuitively highlighting the student's movement error outside the "ghost guide" of the expert.
Figure 8:
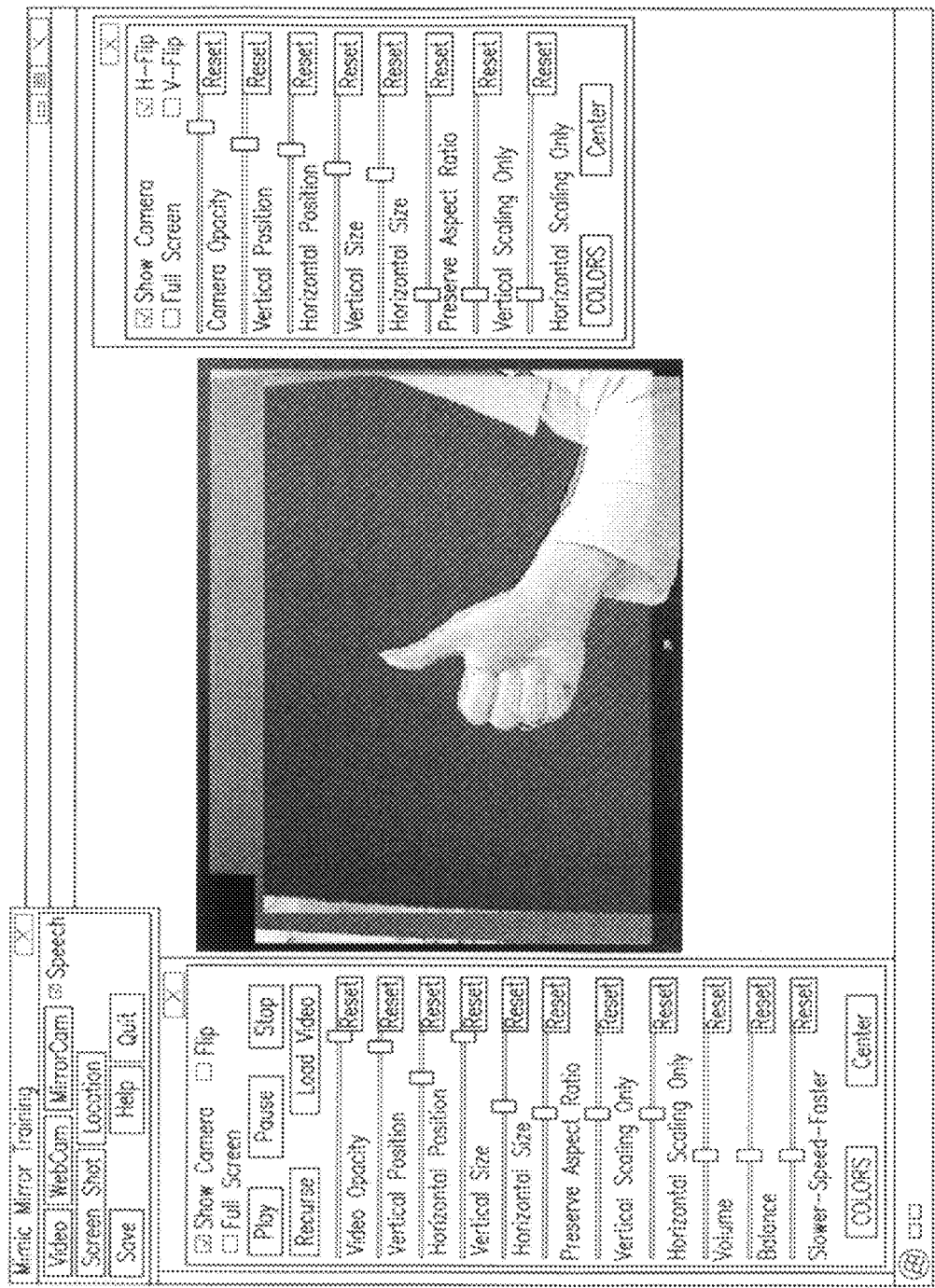
FIG. 8 depicts an exemplary embodiment of a screen capture of the opaque semi-transparent expert's "ghost guide" underneath the semi-transparent "ghost" web camera view of the student with a third opaque background color selected so that errors are clearly visible for human perception, and/or automated error detection, alerts, etc.

To assist a user distinguish between two overlapping images, a number of exemplary techniques may be used. For example, FIG. 4 depicts an exemplary embodiment of a screen capture of a semi-transparent expert's "ghost guide" over top an opaque web camera view of the student. FIG. 5 depicts an exemplary embodiment of a screen capture of an opaque expert's "ghost guide" underneath a semi-transparent "ghost" web camera view of a student. FIG. 6 depicts an exemplary embodiment of a screen capture of the semi-transparent expert's "ghost guide" underneath the semi-transparent "ghost" web camera view of the student, with tints are applied to the expert's ghost guide, student ghost, and background showing the color change intuitively highlighting the student's movement error outside the "ghost guide" of the expert. Further, FIG. 8 depicts an exemplary embodiment of a screen capture of the opaque semi-transparent expert's "ghost guide" underneath the semi-transparent "ghost" web camera view of the student with a third opaque background color selected so that errors are clearly visible for human perception, and/or automated error detection, alerts, etc.

Figure 7:
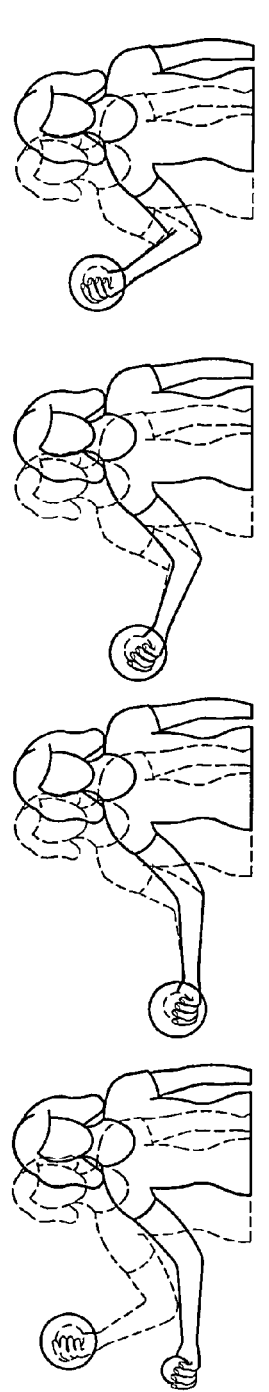
FIG. 7 depicts an exemplary embodiment of a series of four screen captures of the semi-transparent expert's "ghost guide" underneath the semi-transparent "ghost" web camera view of the student where real world mirrors are used within the videos' field of view to present more than one pose view simultaneously.

FIG. 7 depicts an exemplary embodiment of a series of four screen captures of the semi-transparent expert's "ghost guide" underneath the semi-transparent "ghost" web camera view of the student where real world mirrors are used within the videos' field of view to present more than one pose view simultaneously. Capture Frame#1 shows annotations of the semi-transparent expert ghost guide on the left oversized and the student offset to the right to emphasize that the images are different and the superimposition and axis of movement for this exercise are their right elbows. This shows the student within a front view real-world image. Frame#2 shows the student moved to the other side of the pre-recorded teacher imagery where the teacher's image appears and student images are at the start of the arm curl movement exercise. Frame#3 shows the student moved to the other side of the pre-recorded teacher imagery where the teacher's image appears and student images are midway through the arm curl movement exercise. Frame#4 shows the student moved to the other side of the pre-recorded teacher imagery where the teacher's image appears and student images are at the top of their arm curl movement exercise.

Exemplary embodiment of the invention may be selectively mirror flipped, to directly enable users simultaneous perceiving multiple pose angles of a live camera viewing and/or prerecorded teacher media where a real-world mirror is within the field of view. Whereby, a teacher being video recorded with 45 degree slanted mirror to each side provides a center front view, and the two 45 degree poses. Because of the real-world mirror physics the two 45 degree poses can appear backwards from the center front view movements, a "flip" capacity enables the user to correct for the mirror reversal, so that they can intuitively use any of the three teacher images as a "ghost guide" by the simple expedient of physically moving to align with the desired "ghost guide". Further the user can have similar mirror surrounding themselves as the live camera feed images them so that they can simultaneously see their own movements in 3-dimensional (3D) within the 3 different pose angles of the teacher. Virtual mirror flipping is enables a virtual form of Phantom Limb Pain Mitigation or Elimination Therapies (as disclosed in further detail below). Virtual mirror flipping along with semi-transparency enables new types and classes of cosmetic applications to enhance symmetry or selection of the best features on the two different halves of the face to enhance (as is further disclosed below), and to enhance symmetry of speech or facial expressions, especially to mitigate negative impacts from a stroke or other disease disorders.

Figure 9A:
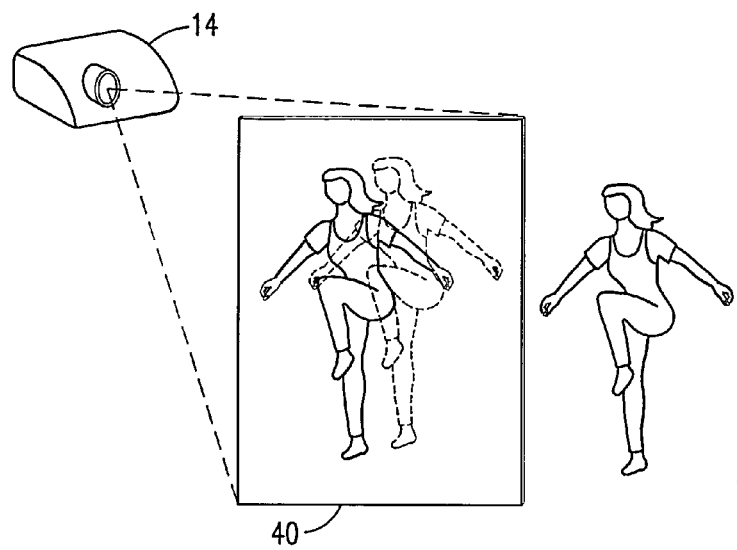
FIGS. 9A and 9B depict exemplary embodiments of a device and/or an arrangement that provides Mirror Mimic Training processes to an existing display device such as a TV or Computer display.
Figure 9B:
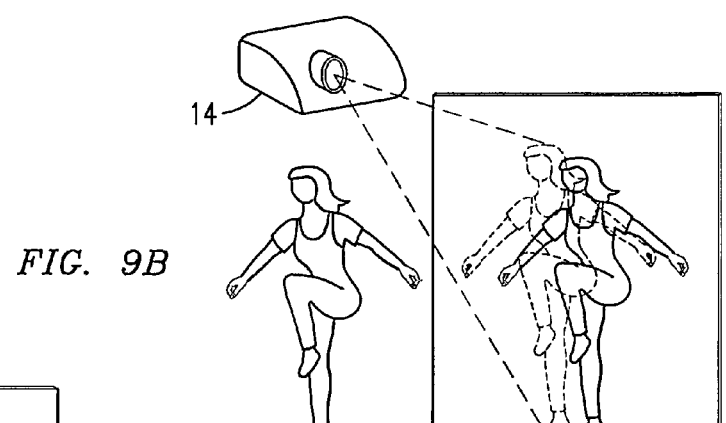

FIGS. 9A and 9B depict exemplary embodiments of a device and/or an arrangement that provides Mirror Mimic Training processes to an existing display device 14 such as a TV or Computer display. FIG. 9A discloses a semi-transparent mirror 40 whereas FIG. 9B discloses a "real world" or regular mirror 41. By purposeful arrangement of semi-transparent reflective surface film to a screen, control of the display intensity and/or colors, along with appropriate lighting and/or colored lighting of the user such that the user positions self so that their semi-transparent "ghost" image reflected off of the film applied to the display surface is superimposed upon the expert's image they are mimicking is possible.

Figure 10:
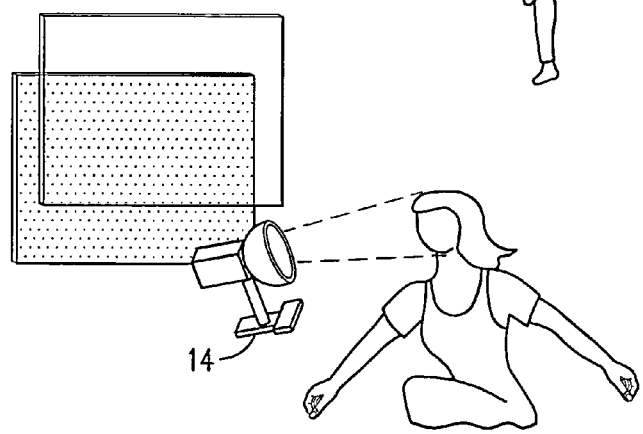
FIG. 10 depicts an exemplary embodiment of a device and/or arrangement that provides Mirror Mimic Training ("MMT") processes to an existing projection display device onto a mirror.

FIG. 10 depicts an exemplary embodiment of a device and/or arrangement that provides Mirror Mimic Training processes to an existing projection display device 14 onto a mirror. This display device 14 comprised a semi-transparent mirrored film (auto tint film could work as well). A bright light is illuminated on the user so that reflection is easy to see in a darkened room. The user may position her/his self so that their mirror reflected image reflected is superimposed upon the expert's image being projected onto the same mirror surface, or back projected on to a back projection with partial transmission through the reflective film on the projector side of the screen, and/or arrangements of beam splitters to enable superimposed images for Mirror-Mimic Training processes.

Figure 12:
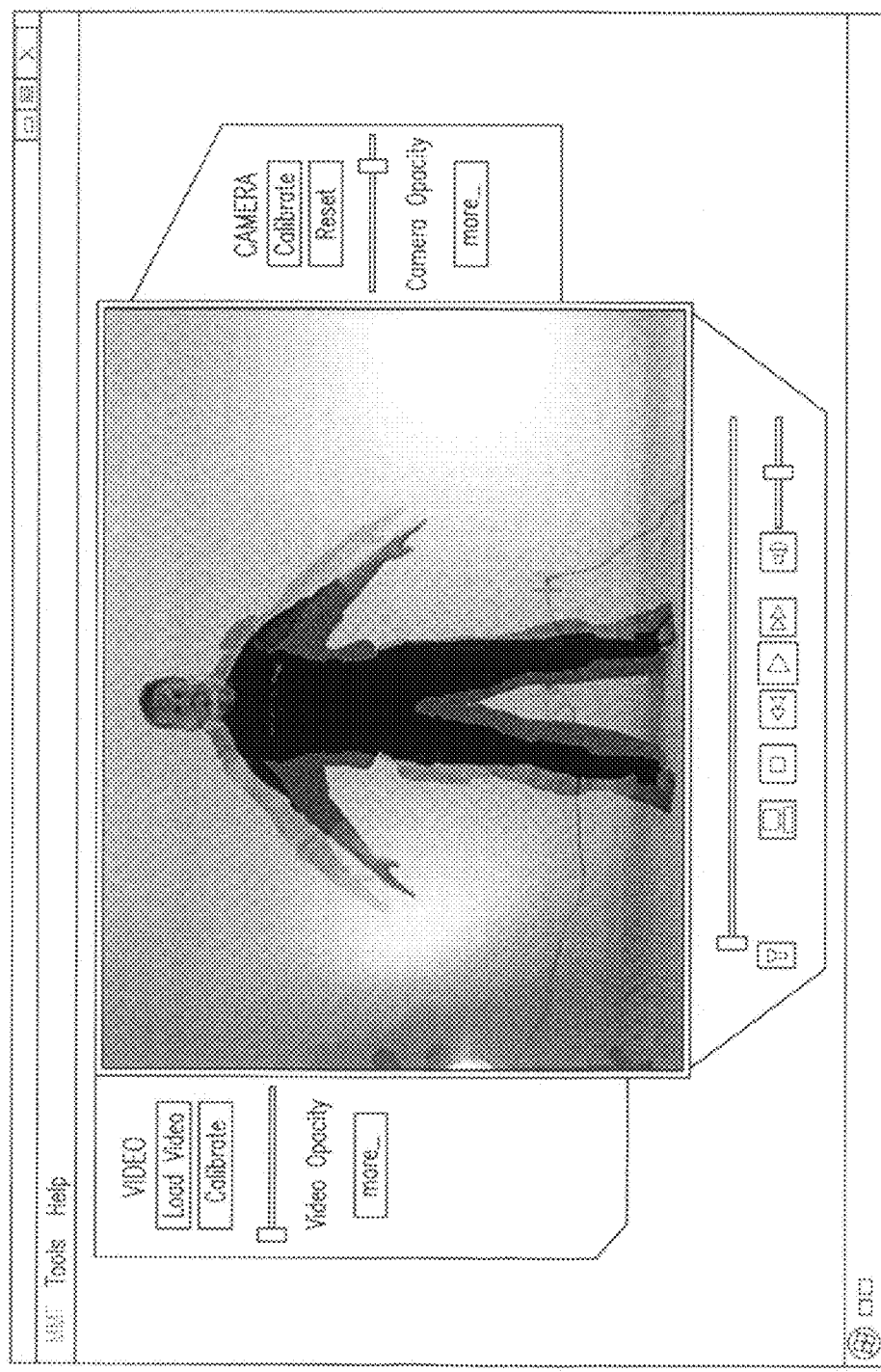
FIG. 12 are screen captures of an expert being motion captured by a Microsoft Kinect module and displayed on a small arms training device display as an Avatar with our Mirror Mimic software running in the foreground semi-transparently mimicking the avatar.

FIG. 12 are screen captures of an expert being motion captured by a Microsoft Kinect module and displayed on a small arms training device display as an Avatar with our Mirror Mimic software running in the foreground semi-transparently mimicking the avatar. For example, MMT Camera Layer and Media Content Layer, an avatar is driven by motion capture systems (our preference is the Kinect modules). The use of motion capture system to drives the Avatars provides the users complete virtual control over the type, size, attributes of the Avatar as well as 3D perspective viewing from any angle or positions.

In another example, MMT User Layer and Media Content Layer, both avatars are driven by motion capture systems (our preference is the Kinect modules). The use of motion capture system to drive both Avatars and provides the users complete virtual control over the type, size, attributes of the superimposed Avatars as well as 3D perspective viewing from any angle or positions. In another example, User Layer and Media Content Layer, both Avatars are driven by motion capture systems and viewed with a 3D display (e.g., new 3D Movie and HDTV displays, etc.) to add the third dimension to MMT such as 3D holographic type ghosts.

Thus, using MMT techniques with a 3-dimensional (3D) avatar is possible. Thus though the figures included illustrate 2-dimensional images, they are also applicable with 3-dimensional images. In one example, a Kinect (or any other motion capture system) driven 3D avatar driven enables the user/student/patient to view the expert's semi-transparent superimposed "ghost guide" from any angle, distance, perspective. Our basic video based solution restricts the user/student/patient positioning to the same angle, distance, perspective as the original expert's video camera (with some auto calibration scaling support, but it is not as good as complete 3D control over the Avatar). As explained herein, the 3D Avatar can be opaque with the user being the ghost superimposed or both the 3D Avatar and the user can be semi-transparent superimposed.

In another embodiment, the avatar can be auto scaled to fit the user, and/or actually drive an actual 3D avatar version of the user/student/patient for a perfect fit (or slight over-scale so that you can see the edges of the guide). In yet another embodiment where both the expert and the user are avatars which enables users to practice without being self conscious or ashamed of aspects of their avatar (when the avatar is representative of the user), such the user being overweight, or disfigured (amputees, etc).

Another embodiment may involve multiple synchronized copies of the 3D avatar which are simultaneously for additional references, such as, Quad windows showing the 2.5 D projection like a CAD program in the upper left and the other three windows showing front, side, and top views. Another embodiment may involve 2 or more people involved in an activity, such as but not limited to dancing or practicing martial arts together (this works well with the video based version of MMT already). Yet another example is where the 3D avatars (experts and users all have Avatars) is 3D displayed with the new 3D HDTV technologies for holo-desk-like new uses.

Figure 11:
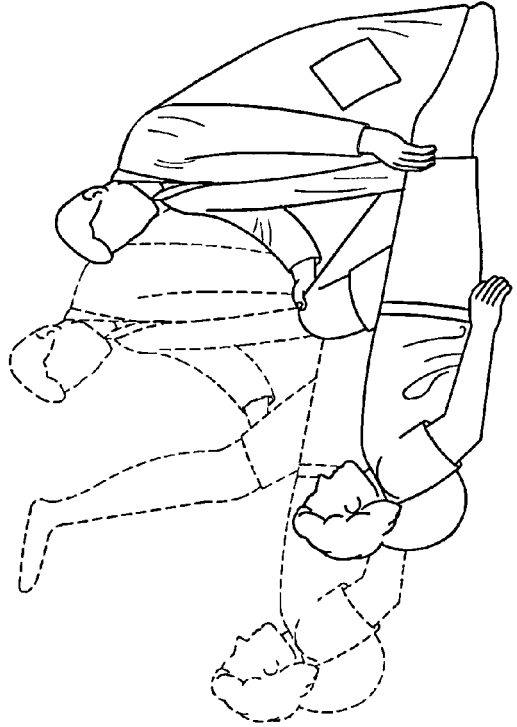
FIG. 11 are screen captures of a user only showing one limb in the camera view simulating an amputee, and then using the special mirror replication feature of the Mirror Mimic invention to "mirror replicate so that a user sees the "missing limb" can move the remaining limb to feel relief similar to the real world mirror box technique for reduction/elimination of phantom limb pain therapy.

Exemplary embodiments of the invention may be used for various types of training. For example, FIG. 11 depict screen captures of a user only showing one limb in the camera view simulating an amputee, and then using a special mirror replication feature of the Mirror Mimic invention to "mirror replicate so that a user sees the "missing limb" can move the remaining limb to feel relief similar to the real world mirror box technique for reduction/elimination of phantom limb pain therapy. Another example is MMT Media Content Layer as Semi-Transparent, where a university student records herself using a standard web camera doing a new dance sequence she created. Using the invention software with the same web camera, her friends can view themselves opaque as they intuitively learn the dance movements and timing through viewing themselves within the original university student's semi-transparent ghost guide. Exemplary embodiments of the invention also enable the user to horizontally or vertically flip the camera or the other content (pre-recorded or live), to overcome left-right mirror reversals to the specific user's preferences.

In another example, MMT Camera Layer as Semi-Transparent, a home user downloads a new movie's karate movement sequence off of YouTube.com or from Hulu.com. Using an exemplary embodiment of the invention he can select to have his web camera driven image appear as a semi-transparent ghost overtop of the movie sequence content as it is replayed by any current movie or media player software, and/or as a user selection within the MMT application. So the home user can see his own video imagery as a semi-transparent ghost superimposed over top of the expert's imagery shown within the YouTube video.

In yet another example, MMT Camera Layer AND Media Content Layer as Semi-Transparent, virtual live dance enhanced telepresence sessions are used where the web camera view of the remote dance instructor appears as semi-transparent "ghost guide" on the students display, and conversely the students ghost appears on the instructors display. Using the invention's superimposed display both instructor and student can adjust their training session complete with seeing the other's image within each other, and talking through the timing and muscle uses of the movements. This example illustrates one version of live to live Mirror Mimic interactions.

In yet another example, MMT Camera Layer AND Media Content Layer as Semi-Transparent and Opaque Combinations, virtual live dance enhanced telepresence sessions are used where the web camera view of the remote dance instructor appears as semi-transparent "ghost guide" on the students display or opaque as long as the camera layer is the opposite or semi-transparent. This example again illustrates versions of live to live Mirror Mimic interactions using the invention's superimposed display both instructor and student can adjust their training session complete with seeing the other's image within each other, and talking through the timing and muscle uses of the movements.

In another exemplary embodiment, many multiple layers controlled by multiple users for synchronizations of multiple users for entirely new classes and types of training. A plurality of people may use their own web cameras from home, can simultaneously dance within each others' images for a new type of intuitive composite collaborative and or training environment.

Operation of exemplary embodiments of the invention is through invoking an executable code through a conventional means, and then selecting the features desired of a video media window, or live camera window that are superimposed. Operation methods include user selection of the live camera window only selected as semi-transparent over any content video, stills, etc. displayed within any programs, video player, slide presenter, browser, etc. so that the user can match "ghost imagery" of their own movements superimposed to the underlying opaque media content (e.g., Browser, video player content, etc.) This may work for any existing content, and may also work for any training equipment training. The video ONLY as a semi-transparent over any opaque camera view, so that the user can match her/his own opaque imagery movements superimposed to underneath the semi-transparent media content. This may work for any existing content and also work for any training equipment. Both the live camera and video as semi-transparent enables user adjustments of the semi-transparency (opaque level) of each window optimally for the varied lighting conditions, etc enabling the ghosts to be superimposed ideally. This works for any existing content, and also works for any equipment training. Both the live camera and video as semi-transparent plus user selected tinting of each layers plus optionally a third underlying contrasting or additive color layer background enables user adjustments of the semi-transparency (opaque level) of each window optimally for the varied lighting conditions, etc enabling the ghosts to be superimposed ideally and errors outside the ghosts to be intuitively human visualized or automated detected (by color combination changes). This works for any existing content, and also works for any equipment training, etc. Any of the above selections, plus options for user selecting, green-screen, blue-screen or other colors or color ranges and backgrounds to remove dynamically from the media content and/or the live camera views to better see the objects of interest without background distractions (e.g., Human figures, etc) are also possible. In another exemplary embodiment, any of the above selections and options may be used plus additional options may include selecting portions of the screen for selective mirror flipping, enabling new classes of use of one's own face to develop symmetry beauty techniques where the left half of the face is mirror as a semi-transparent guide, to aid applying makeup for enhanced beauty and symmetry. Alternatively as disclosed herein, exemplary embodiments may be used as a virtual form of mirror therapy for Amputee Phantom Limb Pain, Mitigation and/or Elimination.

Software engineers with typical skills can recreate truly semi-transparent windows, using Visual Studio 2008 or 2010 Professional (or similar and later tools) in Visual Basic or C# (or other languages) building a Window Presentation Foundation (WPF) Application select the window properties for Appearance, and check the box labeled AllowsTransparency. Also very important again within Appearance go to the WindowStyle label and use the dropdown arrow to select "None." If you fail to select None, semi-transparency of the entire window will NOT run at all, an exception will be thrown and the execution will stop with an unrecoverable error. Also as a cautionary, selecting None requires that the software engineer to provide explicit controls for width, height, position, etc that will not be present as expected within a normal window context.

The theory of operation provides for Mirror Mimic Training/Technologies which enable superimposing of multiple semi-transparent layers for enhanced training, therapies, and even automated change detections. Multiple new classes, new types, and new levels of intuitive and automated operations are enabled including but not limited to superimposing dramatically increases resolution and perceived size versus conventional side-by-side methods enabling users to more easily see the expert's and their own imagery as well as see finer details on any given display; superimposing dramatically reduces eye-saccades versus conventional side-by-side methods enabling users to see perceive more updates per given time period (the eye is "blind" during eye-saccade" movements) enabling users to more rapidly perceive, process, and remember content; the user as semi-transparent ghost imagery superimposed within and overtop of the underlying expert's opaque imagery; the user as opaque imagery superimposed within and underneath the expert's semi-transparent imagery; the user selected combinations of semi-transparent layers superimposed all enable the users to intuitively align "ghosts" for training, therapies, etc., and real-time background elimination for all extraneous content so that only the ghosts or equipment of interest are used. We support green screen and chrome key background elimination along with a Kinect module based depth buffer automated background eliminations. Other new levels of intuitive and automated operations include a user selection of both semi-transparent layers with tinting for the live camera and video media content playback along with a third tint or solid color for the underlying most opaque layer enables dramatic color changes when either of the tinted layers overlaps outside the other. Specifically, this new use enables humans to intuitively and easily perceive synchronization and/or position errors, likewise automated detections and alerts; users selection of sections of a layer for mirror flipping and semi-transparency enables use as a symmetry guides so such uses a cosmetics applications to the face appear more symmetrical, and/or emphasis the best features from each side of the face, relearning facial expression, movements, speech after stroke, injury, or disease; user selection with Avatar limbs or other virtual visualization constructs to enable instruments or 3D body tracking to animate missing limbs or digits for rehabilitative therapies, practices, or exercises; and many other new uses, in sports, exercise, health, military training, social training, etc.

Users can scale any layer to aid over sizing, or matching of the superimposition uses. Users using Avatars can rotate and view the superimposed avatar/video or avatar/avatar pair from any angle or perspective! Adding 3D displays enables ultra realistic 3D mimicking as superimposed pairs. Any number of users can be superimposed so that entire groups can intuitively practice their synchronized dance or martial arts moves, etc. Thus, key concepts of operation are user selectable and/or automated alpha channel blending of layers superimposed for "ghost guidance", and tinting towards perception and change and/or error detection automations and enhancements. The superimposition resolution increases and reduction of eye-saccades are vastly superior to the prior art for learning, teaching, training, edutainment, rehabilitation therapies, beauty technique sharing, and equipment training in general.

In another exemplary embodiment, beyond semi-transparent tinting superimpositions, actual video operations such as inverse scanning and or background removal can be embodiments so that the expert guide appears as moving and dynamically reshaping "hole" within displayed imagery, so that the user dynamically moves to keep his body and/or equipment within the experts' "hole". For example: using green or blue screen techniques an expert's Karate lesson can be inversely processed so only the green screen appearing as a colored layer remains with a moving reshaping hole showing the movements of the expert. Using green or blue screen techniques conventionally enables the user video to show their own moving body (and/or equipment) only with the background removed. Superimposing the two imagery streams enables the user to see his own image clearly staying within the hole, when the user makes an error their semi-transparent body parts that in error extend beyond the hole will be readily visually apparent. Alternatively the layer priorities can be set so that the user only appears within the hole, and any part of the user's body or equipment not within the hole appears cutoff, again this provides an intuitive easy to see "at-a-glance" differences for the user to correct. Essentially, any method of annotate of other surfaces or layers pixels or data elements or other objects to calculate and confirm the viewable nature of other surfaces or layers pixels or data elements or other objects from the superimposed "source" pixels is possible.

Semi-Transparent projection of internal body spaces onto the exterior of the Mirror Mimic Training imagery or onto the actual surface of the user can have visualization benefits. For example, a dynamic sonogram recording an arms movements can show the bones moving within and projected onto users own image displayed on a screen or projected, on a avatar, or onto the exterior skin or clothing of the users themselves (with digital warping and distortion correction of curved and irregular surface accommodation).

Beyond the use of motion capture systems to drive avatars, additional hybrids may be used where a sensor provides inputs for body parts that are not there (amputees), or equipment mock-ups for real-equipment. Examples include, via pattern and edge matching algorithms we virtually attach a prostheses for a recovering warfighter's amputee stump to practice with. Even if the stump is too freshly wounded to support any prosthesis, exemplary embodiments of the invention would add a virtual semi-transparent virtual leg or prosthesis for the warfight to practice with the surrounding collar that senses his muscular contractions or neuron firings in the remaining stump so that he can practice without any additional injury or weight to his wound site. Further, he can practice with a light weight temporary prosthesis, again keeping his muscles and neurons healthy to avoid atrophy. Specifically, the recovering warfighter can practice and stay fit and health with rehab specialist coached movements and exercises, with MMT enabling self practice as well as compliance monitoring.

New uses for the previously described Phantom Limb Pain Mitigation/Elimination Mirror Mimic Training features for rehabilitation, sports training, beauty or cosmetics treatments, massage, gate training, etc. are also possible using exemplary embodiments of the invention. For example, symmetry is a key attribute universally used in judging beauty in humans and animals (and/or fitness of a mate in the animal kingdom) which is driven by Darwinian Natural Selection and from our bi-lateral evolution. Using the Phantom Limb Pain Mitigation/Elimination Mirror Mimic Training features, disclosed above, to provide the "ghost guide" pre-recorded video to present the actual left side image, along with the mirror flipped image of that same left side view appearing in place of the right side view, enables the users to use their own left side movements to act as an intuitive guide for training the right side movements to exactly mimic there natural left side. This process enables user to gain symmetry and coordination in their movement using themselves and the mirror flip feature semi-transparently. Likewise limps, improper walking after an injury or cast wearing period, can be easily visualized and self corrected with the use of this version of MMT.

In another example, with the use of an internal body imaging sensor in place of cameras an evolution from the current side by side or sequential viewing of bone movements during tasks which place all the cognitive processing and memory loading on the medical staff to do the comparison is possible. Using MMT as disclosed herein, intuitive simultaneous superimposed viewing of two bi-lateral sides mirror flipped and semi-transparently superimposed over top of the normal view of an individual's bone movements is possible. Further, the MMT reduction in eye saccades also benefits the users, as highlighted previously.

In another example, in the long tradition of animal forms in Martial Arts, MMT may be used to provide for simultaneous superimposed semi-transparent "ghost guide" viewing of an animal's attack movements to guide the human's mimicking movements. Thus, "strike like a Cobra" or "Kick like a Mule" will have entirely literal embodiments from MMT uses.

Exemplary embodiment of the invention may also be used with learning sign language and/or learning lip reading media. Existing sign language training is available via YouTube videos that conventionally train sign language. Utilizing MMT where the student's image is captured with a camera would allow for more effective learning. Similarly with lip reading training, the student would be able see their own facial image and lips within the speakers when the speaker is provided via a video. Existing, or ODU, or VA, Created Custom Examples of Lip Reading Video for new Mirror Mimic Technologies where the expert's face appears semi-transparent as a ghost guide and students/patients can mimic from within the ghost guide. Exemplary embodiments of the invention can also be used for Teaching Deaf to Talk correctly. Both should benefit the patient by direct stimulation of their own mirror neurons while practicing within the MMT "ghost guides"

Exemplary embodiments of the invention may be used with games as well. For example, lip reading video super karaoke game versions may be enhanced where new MMT versions of game files would be possible where the sound file can be turned off, or used intermittently so that eventually the patient is only hearing the audio at their own hearing level (ultimately we can replicate frequency loss, sensitivity deficiencies, etc.) A game that could be developed is a lip reading name that tune game. Such a game can use MMT taught herein as a game that makes lip reading skill acquisition, practice to criteria, or refresher training fun. Another exemplary therapy and/or game technique may involve MMT Affective Therapy Augments to Positively Motivate Listening and Hearing Therapies and Games. For example, Affective "Sing-Along", "Chants", "Repeat-Along-this-Sentence" prompts that are purposefully constructed from phonemes sequences to directly affect the singers' emotion states is possible. This new innovative process (or therapy adjunct) exploits the speaking of the phonemes to directly drive facial expressions sequences, which in turn exploit Humans' innate involuntary facial expression feed forward loop into a users' actual emotion states. There are multiple Facial Action Coding System researchers' reports of practicing Facial Action Coding System (FACS) facial expressions manifesting the real emotion feeling and physiological changes by the mere act of practicing facial expressions, holding pens in the mouth that covertly induce a frown or smile affecting users ratings of the funniness of comics, and actual facial clamps that all work to affect emotional states. Additional capacities include adding options for Mirror Mimic Training so that singers can see their own faces singing within the semi-transparent ghost guide of the attractive expert singer they are singing along with to trigger the mirror neuron associated mechanisms. Another option is for Neuro Linguistic Programming (NLP) words and word-sequences that cognitively affectively reinforce the same emotions that are constructed from our purposeful phoneme affective FACS constructs.

Other uses include, but are not limited to providing for TBI Recovering Warfighters relearning emotional face reading of others by using the emotional face reader outputs with the videos of other emoting. Specifically, having the emotional face reader real-time displaying each emotion as it occurs in the teachers face. Obviously by using MMT as taught herein, will enable the recovering warfighters to practice the facial expressions from within others faces they are relearning to emotionally face read others. Another use is TBI Recovering Warfighters relearning how to facially emote themselves by using MMT disclosed herein to provide an intuitive practice environment within example videos of others, or of themselves coached by experts, where they can later practice at home or on their mobile devices without the expert being present.

Neuroscience Mirror Neurons fire within the observer when said observer is concentrating on learning other individuals' movements. It follow that the recovering warfighter's concentrating on another individuals lip movements also fires their own corresponding facial motor mirror neurons within our observing warfighter. Further it follow that the recovering warfighter actually moving his own lips within the MMT semi-transparent ghost guide will further benefit. Another way to understand this implementation is with an understanding that Darwinian Natural Selection evolved Human Mimicry capacities support advanced and rapid learning. Thus, the physically passive but cognitive active task of closely observing another person's movements can promote learning via Neuro Plasticity. It thus follows that the MMT intuitive real-time mimicry with actual physical movements within the same body parts reinforce mirror neuron network being grown through plasticity.

Thus, exemplary embodiments of the prevent invention uses superimposed media, such as semi-transparent media, which require few to no eye saccades thus having the same throughput and retention advantages demonstrated by RAPCOM, and the many publications under the title of Above Real Time Training (ARTT) published by the inventors of this Mirror Mimic Training patent application.

Exemplary embodiments of the present invention's use of superimposed semi-transparent media also require few to no eye saccades thus having the same throughput and retention advantages demonstrated by RAPCOM where the present invention comprise (1) live video imagery semi-transparently superimposed combined with existing media content, virtual or augmented reality shapes to shown known differential information where semi-transparent tinting can show the areas where the student movement are "outside" the experts "ghost guide" especially with purposeful selected background colors to highlight by color combination changes such as a red tint student over a blue tint teacher, with a yellow background will flash orange every pixel where the red student is not covered by the blue tint teacher; (2) automated means to monitor, detect, and alert to colors generated by the tinted layers; and (3) enhancing the comparison information with the recentness of the last movement errors as a function of elapsed time (or other criteria, such as scanning for a rate of change, pauses, delays, etc.)

Exemplary embodiments of the invention result in Human Computer Interface and Training enhancements where human users can easily see where their opaque image video movements are superimposed within the expert's semi-transparent "ghost guide" video imagery, to naturally mimic positions, movements, angles, rotations, pauses, forms, combinations, etc; Human Computer Interface and Training enhancements where Human users can easily see where their semi-transparent video imagery movements as a "ghost" superimposed OVER-TOP the expert's opaque guide" video, to naturally mimic positions, movements, angles, rotations, pauses, forms, combinations, etc.; and Human Computer Interface and Training enhancements where the Human users can select to "mirror flip" their own video imagery to overcome the disturbing right/left switching common in mirror reflections or video recordings. This is a user preference setting selectable by the user. Others include, but are not limited to Human Computer Interface and Training enhancements where the Human users can select to "mirror flip" their expert's video imagery to overcome the left handed, right-handed differences as well as disturbing right/left switching common in mirror reflections or video recordings (where this is a user preference setting selectable by the user; and Human Computer Interface and Training enhancements where Human users can easily see where their semi-transparent image video imagery movements as a "ghost" are superimposed within the expert's semi-transparent "ghost guide" video, to naturally mimic positions, movements, angles, rotations, pauses, forms, combinations, etc. Further, this is not limited to just two layers; any number of viewable layers can be useful using the inventions recursive capacities to call more copies of itself. For example, one semi-transparent layer of the expert teacher's movements, with synchronized replay of another semi-transparent layer of the student's prior month's performance video from last month within the teacher's ghost guide, and a third opaque layer underneath the other two displaying the web camera view of the student's current performance, within the teacher's ghost guide, and students prior month's recording so as to intuitively show improvements versus both the expert and not repeating their own errors from the prior month's performance. It's recommended for the student to be wearing different clothing so as to not confuse themselves with last month's imagery and their current live view imagery.

Beneficial advantages include computer automations comparison enhancements where the differences can easily understand where the teacher and student movements have occurred together and simultaneously along with intuitive understanding where movements have not occurred correctly in both space and time, including but not limited to obvious color tinting differences and combination colors, intensity/brightness changes, flashing patterns, and/or animations, etc. For example, a semi-transparent red tinted student layer (using a GPU shader algorithm or CPU means), a semi-transparent blue tinted teacher layer, and a big yellow opaque background behind both student and teacher layers provides a the students "ghost" image as purple tinted when they proper stay within the teacher's "ghost guide" image (Red Student+Blue Teacher=Purple Combined Image), however, if the student makes an error and moves OUTSIDE of the teacher's "ghost guide" image, that portion of the student's ghost image flashes from a muted purple to a bright orange color. (Student's entire arm that does not match the teachers movement changes to Orange. (Red Student+Yellow Background=Orange Combined Image). Further automated detection and alert algorithms can exploit these color changes natively for enhanced difference detections and accurate performance assessments/scoring, etc. In fact Graphic Processor Units can automatically and effectively detect such movement errors and send even alerts based upon such color changes.

Mirror Mimic Training superimposed viewing is intuitive, as it exploits innate Darwinian natural selection evolutions for mimicry including activation of mirror neuron systems within Humans, and reduces or eliminates scanning eye saccades, increases information throughput, and increases retention of the faster presented information. Mirror Mimic Training enhances results in both space and time.

Human Computer Interface and training enhancements are possible that enable human students to view the superimposed images larger within the display space; at higher resolution; and inclusive of more detail than conventional side-by-side comparisons. For example instead of two smaller side-by-side images, the user can view one much larger higher resolution combined image. This is a huge advantage as the resolution increases as an exponential square function. The resolution increase of using the superimposed method is on the order of 4-times (as a dependent function of screen aspect ratio and window displayed size; the newer wide screen displays may reduce the advantage to the order of 3-times, which is still significantly beneficial to our users). Another benefit is with Human Computer Interface and training enhancements that enable human students to view pre-recorded content at Above Real Time Training rates (see Inventors prior for performance increases, increased effectiveness, increased efficiency; and increase retention both aided and unaided recall. Further, exemplary embodiments of the invention also support real-time playback to aid early skill acquisition, enabling a teacher to slow motion show movements of interest (or prior errors what the student is doing wrong movements or timing, etc.), and provide adaptive training for multiple levels of students as they progress from below-real-time, to real-time, to above real-time.

As explained above, users are able to dynamically select a color, colors, or color range(s) within the video content (pre-recorded or live) such as green screen backgrounds to further enhance the clarity of the human forms within the video without background distractions (e.g., blue screen, green screen backgrounds, etc). Exemplary embodiments of the invention support the use of Microsoft's Kinect™ modules depth buffer to do background elimination without a need for a specialized background object, or any color requirements. Exemplary embodiment of the present invention may result in a production of a superimposed combined video imagery for later review, annotations, analysis, and/or discussions by the student, experts, and/or others.

Further, though visual warning are discussed above when the images are not in alignment, the processor 32 may be included and provide for automated monitoring where warnings, alerts and movement error highlight are intuitively displayed including a preferred embodiment which also provides the optional fading based upon temporal period since last errors occurred. Specifically, Human Computer Interface enhancements where the Humans and/or Computer Automations can easily see where/when the student movements match the expert's movements and where/when the movements do not match in both space and time.

As disclosed above exemplary embodiments result in intuitive semi-transparent "ghosts" layer or layers which are superimposed for enhanced training benefits, where an ability to perceive incorrect movement outside the expert's "ghost guide" or opaque content, so as to enable self-instruction is possible. Exemplary embodiments of the invention result in enhancing multiple superimposed semi-transparent layer(s) and/or with opaque layer(s) so as to provide entirely new classes and types of training benefits, automated difference detections, alerts, or universal translation between disparate software or media applications. This is done with dramatic increases in throughput and retention based upon uses with semi-transparent superimpositions of multiple objects with the advantages of reducing and/or eliminating eye-saccades based upon Rapid Sequential Visual Presentation science. This is further accomplished with motion capture driven avatars, such as 3D avatars, of the expert, the student, or both which enables true 3D viewing and perspective selections from any viewing angle or perspective of the superimposed pairs. Motion capture driven avatars of the expert, the student, or both also enables use of 3D displays for realistic 3D experiences of Mirror Mimic Training and Practice, where movement of the Experts and User Avatars can be live or prerecorded. Outputs of the superimposed combined video imagery may be saved for later review, annotations, analysis, and/or discussions by the student, experts, and/or others.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated, any use of the terms first, second, etc., do not denote any order or importance, but rather the terms first, second, etc., are used to distinguish one element from another.

The invention claimed is:

1. A system for visually superimposing a first image that may be in motion over and/or under a second image that may be in motion, the system comprising:
   at least one generating device to provide a first image and a second image
   a display device to display the first image and second image superimposed with each other; and
   an adjustment device for reconfiguring the first image and/or the second image to a size in agreement with a non-adjusted first image and/or second image, to a size in agreement with the display device, and/or to a size acceptable by a user;
   a processing means which uses cameras, virtual reality generators, augmented reality generators, and/or mixed reality image generators, along with hyper-spectral sensors, 3D stereoscopic sensors, and/or hyper-stereoscopic sensors;
   wherein the first image or the second image is displayed in a different media than the other image to allow for a distinction to be made between movements occurring in both images.

2. The system according to claim 1, wherein the first image is an image of the user and the display device is configured for the user to use mirror mimicking training to learn the motion illustrated with the second image.

3. The system according to claim 1, wherein the different media comprise semi-transparent media, opaque media, superimposed visualization surface, tinting changes, alpha changes, color changes, intensity changes, temporal changes (flashing, blinking, special textures, etc.), lighting changes, texture or pattern changes, sharpness changes, contrast changes associated look-up lists of modifiers, and/or other differential semi-transparency and imagery mixing means.

4. The system according to claim 3, wherein the selection device may determine the media ranging from a fully opaque media to a fully transparent media, calculated as a function a best image based brightness, contrast, and gain.

5. The system according to claim 3, wherein the selection device may determine the media based on alpha channels, GPU lighting and shadowing automation means, CPU lighting and shadowing automation means, frame-buffer utilities, network utilities, pre or post processing of imagery.

6. The system according to claim 4, wherein the pre or post processing imagery comprises image generation for virtual reality or augmented reality and/or from an image input device.

7. The system according to claim 5, wherein the image input device comprises a camera capture device.

8. The system according to claim 1, further comprises a selection device for the user to determine the media being used for the first image and/or the second image.

9. The system according to claim 1, wherein the display device comprises a processor configured to select from the displaying the first image and/or the second image opaque, semi-transparent, fading, morphing, blinking, overlapping, mirroring, adjacent, superimposing, time-sequencing, warping, distorting, scaling, coloring, and/or highlighting.

10. The system according to claim 1, further comprises a processing means to perform alpha channel changes by layer, by color, by region, by date-time tag and/or other tagging means, wherein the processing means comprises central processing unit processing, graphics processing unit processing, and specialized algorithms (AND, OR, NOR, NAND logical operational sequences, bitwise register shifts).

11. The system according to claim 1, wherein the at least one generator and/or the display provide for the first image and the second image appearing in a three dimensional format.

12. A method for visually superimposing a first image that may be in motion over and/or under a second image that may be in motion, the method comprising:
   generating a first image and a second image;
   displaying a first image superimposed with a second image;
   reconfiguring the first image and/or the second image to a size in agreement with a non-adjusted first image and/or second image, to a size in agreement with a device used to display the superimposed images, and/or to a size acceptable by a user;
   processing the first image and/or second image which uses cameras, virtual reality generators, augmented reality generators, and/or mixed reality image generators, along with hyper-spectral sensors, 3D stereoscopic sensors, and/or hyper-stereoscopic sensors;
   displaying the first image and/or the second image in a different media to allow for a distinction to be made between movements occurring in both images.

13. The method according to claim 12, further comprises determining the media being used for the first image and/or the second image.

14. The method according to claim 12, further comprises providing a processing means which uses cameras, virtual reality generators, augmented reality generators, and/or mixed reality image generators, along with hyper-spectral sensors, 3D stereoscopic sensors, and/or hyper-stereoscopic sensors.

15. The method according to claim 12, further comprises providing a processing means to perform alpha channel changes by layer, by color, by region, by date-time tag and/or other tagging means, wherein the processing means comprises central processing unit processing, graphics processing unit processing, and specialized algorithms (AND, OR, NOR, NAND logical operational sequences, bitwise register shifts).

16. A non-transitory computer readable media executable with a processor for visually superimposing a first image that may be in motion over and/or under a second image that may be in motion, the computer software code comprising:
- a computer software module for generating a first image and a second image;
- a computer software module for displaying a first image superimposed with a second image;
- a computer software module for reconfiguring the first image and/or the second image to a size in agreement with a non-adjusted first image and/or second image, to a size in agreement with a device used to display the superimposed images, and/or to a size acceptable by a user;
- a computer software module for processing the first image and/or second image which uses cameras, virtual reality generators, augmented reality generators, and/or mixed reality image generators, along with hyper-spectral sensors, 3D stereoscopic sensors, and/or hyper-stereoscopic sensors;
- a computer software module for displaying the first image and/or the second image in a different media to allow for a distinction to be made between movements occurring in both images.

17. The non-transitory computer readable media executable with a processor according to claim 16, further comprises a computer software module for determining the media being used for the first image and/or the second image.

18. The non-transitory computer readable media executable with a processor according to claim 16, further comprises a computer software module for providing a processing means which uses cameras, virtual reality generators, augmented reality generators, and/or mixed reality image generators, along with hyper-spectral sensors, 3D stereoscopic sensors, and/or hyper-stereoscopic sensors.

19. The non-transitory computer readable media executable with a processor according to claim 16, further comprises a computer software module for providing a processing means to perform alpha channel changes by layer, by color, by region, by date-time tag and/or other tagging means, wherein the processing means comprises central processing unit processing, graphics processing unit processing, and specialized algorithms (AND, OR, NOR, NAND logical operational sequences, bitwise register shifts).

* * * * *

UNITED STATES PATENT AND TRADEMARK OFFICE
CERTIFICATE OF CORRECTION

| | |
|---|---|
| PATENT NO. | : 8,953,909 B2 |
| APPLICATION NO. | : 13/066707 |
| DATED | : February 10, 2015 |
| INVENTOR(S) | : Elizabeth T. Guckenberger and Ronald J. Guckenberger |

It is certified that error appears in the above-identified patent and that said Letters Patent is hereby corrected as shown below:

In the Specification

Column 1, lines 7-14 in the Cross-Reference to Related Applications section, delete the paragraph in its entirety and replace with the following:

--The present application claims the benefit of U.S. Provisional Application No. 61/343,060 filed April 22, 2010. This application is also a continuation-in-part of U.S. Application No. 11/625,181 filed January 19, 2007, now U.S. Patent No. 8,208,764 issued June 26, 2012, which claims the benefit of U.S. Provisional Application No. 60/760,753 filed January 21, 2006, and incorporated herein by reference in their entirety.--

Signed and Sealed this
Fourteenth Day of April, 2015

Michelle K. Lee
*Director of the United States Patent and Trademark Office*